United States Patent Office 3,555,112
Patented Jan. 12, 1971

3,555,112
HYDROXYLATED STYRENE BUTADIENE BLOCK COPOLYMERS
De Loss E. Winkler, Orinda, Calif., assignor to Shell Oil Company, New York, N.Y., a corporation of Delaware
No Drawing. Filed Mar. 20, 1968, Ser. No. 714,453
Int. Cl. C08f 19/00; C08g 45/04
U.S. Cl. 260—836                                    5 Claims

ABSTRACT OF THE DISCLOSURE

Block copolymers are provided which have polyvinyl arene end blocks and a highly hydroxylated conjugated diene center block capable of swelling in water and other hydrogen bonding solvents.

BACKGROUND OF THE INVENTION

Numerous derivatives have been made of the usual hydrocarbon rubbers including both epoxides and hydroxides. One of the convenient routes for producing the latter is to hydrolyze the epoxides produced by peroxidation of conjugated diene polymers. On the other hand, hydroxylated diene polymers may be produced directly. It has usually been experienced that the hydroxylation of rubbers either by the indirect or direct routes results in compounds having chemical interest but little commercial utility. For example, the superficial hydroxylation of such materials results in compounds having polar activity but little change in properties other than possible increase in resistance to hydrocarbon solvents. On the other hand, if higher degrees of hydroxylation of either conjugated diene homopolymers or of random styrene-butadiene copolymers is carried out, the products have been found to be not only highly brittle substances having virtually no elastomeric properties but in the presence of hydrogen bonding solvents result in compounds having virtually no tensile strength.

In recent years a special class of copolymers has been developed which are generically referred to as block copolymers. More specifically, a class of thermoplastic elastomers has been developed having the general structure A—(B—A)$_n$ wherein $n$ is a relatively small integer in the order of 1–8. In these block copolymers the polymer blocks A are generally monovinyl arene polymer blocks typified by polystyrene. The block B is a polymer block of a conjugated diene or an elastomeric copolymer block of random styrene-conjugated diene. A typical and preferred species of such block copolymers has the general structure polystyrene - polybutadiene - polystyrene. While these polymers have unique properties insofar as their exhibition of the properties of a vulcanized rubber without having actually been subjected to vulcanization, they have certain physical properties which it would be desirable to alter or improve. For example, their hydrocarbon sensitivity limits their field of utility. Moreover, it would be desirable to provide a polymer which when hydroxylated to a certain extent will swell or be permeable to water but which at the same time retains a substantial amount of its original tensile strength in the presence of water or other hydrogen bonding solvents.

OBJECTS OF THE INVENTION

It is an object of the present invention to provide improved block copolymers. It is a further object of the invention to provide block copolymers which are swellable in water but at the same time retain a substantial amount of their original tensile strength even in the presence of water. Other objects will become apparent during the following detailed description of the invention.

STATEMENT OF THE INVENTION

Now, in accordance with this invention, improved water swellable block copolymers are provided which have monovinyl arene polymer end blocks and a center block which is a hydroxylated (or hydroxylated and epoxidized) conjugated diene polymer block. The water sensitivity and swellability of the block copolymer is dependent upon the high degree of hydroxylation of this center block. On the other hand, the surprisingly high tensile strength of the block copolymers even in the presence of water is due to the substantially unaffected polystyrene end blocks. Thus the block copolymers have the general configuration A—B—A wherein each A is a monovinyl arene polymer block and B is the hydroxylated conjugated diene polymer block. It is necessary that the monovinyl arene polymer blocks be present in an amount between about 15% and 65% by weight of the total polymer so as to provide the necessary tensile strength when the water receptive center block has been softened or plasticized by the presence of water. Moreover, it is necessary that the monovinyl arene polymer blocks have average molecular weights between about 8,000 and 30,000 as determined by osmotic molecular weight measurements or equivalent measurements. Another qualification is that the conjugated diene center block should be so treated that at least about 50% of the diene linkages in the polymer block are eliminated by first epoxidation and later by at least half of these epoxidized groups being converted to hydroxyls. It is possible, of course, to still further derivatize at least a portion of these hydroxyls such as by replacement of the hydroxyl with an alkoxyl radical and the like or with acyl radical. Still further, any acyl radical may be saponified to provide ion exchange possibilities in the block copolymer. It is necessary, however, that the block copolymer have at least 25% of its diene linkages eliminated by the presence of hydroxyl radicals in order to provide the water sensitivity and swellability which is so important in the product of this invention.

The block copolymers of this invention may be made by several general processes, namely, one in which the original block copolymer is first epoxidized in the diene center block and then is later hydrolyzed to convert at least a substantial portion of the epoxides to hydroxyl derivatives. On the other hand, means are known in the art for directly hydroxylating conjugated diene polymers. The difference between the prior art and the present invention, however, lies not so much in the precise means by which the polymers are hydroxylated but on the contrary in the use of the particularly described block copolymers to provide a hydroxylated center block in combination with the unaffected monovinyl arene end blocks for the provision of high tensile strength in the presence of water or other hydrogen bonding materials.

The block copolymers utilized in the preparation of the hydroxylated derivatives have the general configuration A—(B—A)$_n$. The polymer blocks A are non-elastomeric thermoplastic blocks of monovinyl arenes including styrene, alpha-methyl styrene, vinyl naphthylene and the like. Polystyrene blocks are preferred. Non-elastomeric copolymer blocks may be utilized such as styrene-butadiene copolymer blocks in which the proportion of styrene is greater than about 75% by weight. The center block B is an elastomeric polymer block of a conjugated diene, which is preferably either butadiene or isoprene.

Butadiene is preferred. The symbol $n$ stands for a whole integer between 1 and 8. Thus the type of block copolymers is illustrated by the two species polystyrene-polybutadiene-polystyrene and polystyrene-polyisoprene-polystyrene. These may be prepared by methods known and suggested in the art but are preferably prepared insofar as polymerization is concerned by the use of a lithium-based catalyst. Monolithium organic compounds may be employed and particularly lithium alkyls. Thus the polymers may be made by a sequential process in which the monomers are injected incrementally, the monovinyl arene polymer block being first formed after which the conjugated diene is injected into the polymerization mixture and after formation of the conjugated diene polymer block a monovinyl arene is again injected to form the second terminal block. On the other hand, coupling procedures may be utilized wherein the process involves the formation of, for example, a polymer block of a monovinyl arene and an attached polymer block of a conjugated diene terminated with a lithium radical. A coupling agent such as a divinyl arene or a dihalohydrocarbon is then injected to couple two or more of these segments together to form coupled block copolymers. Such coupled and branched products are considered to be within the scope of the present invention and claims.

Polyfunctional catalysts may be employed for the purpose of forming suitable block copolymers such as dilithiostilbene and the like. In such a case the conjugated diene center block is first formed, each terminal radical of the block being a lithium radical. A monovinyl arene is then injected to form the desired three-block copolymer having the required A—B—A structure. While these three-block copolymers are especially contemplated, it is possible to form suitable and corresponding block copolymers having the general configuration A—(B—A)$_n$ especially wherein $n$ is an integer between 1 and 8. These may be obtained by coupling procedures or by sequential block polymerization. Moreover, branched block copolymers may be utilized in which the polymer comprises a number of non-linear segments which may be either cruciform block polymers, star-shaped block polymers or graft block polymers as long as the proportion of the monovinyl arene blocks is as stated hereinabove and as long as the proportion of these monovinyl arene blocks to conjugated diene blocks is within the generic scope as expressed hereinbefore.

In the preferred process for the preparation of the hydrophilic block copolymers of this invention, the block copolymer is first epoxidized in such a way as to substantially eliminate any possibility of epoxdizing the monovinyl arene polymer blocks but under such conditions that at least about 50% of the residual diene linkages in the conjugated diene polymer block are replaced by epoxides. Epoxidation may be effected by generally known methods such as the use of a peracid exemplified by peracetic acid, hydrogen peroxide in the presence of acetic acid and sulfuric acid or hydrogen peroxide in the presence of a low molecular weight fatty acid such as formic acid. Relatively low temperatures are utilized, in the order of 25–40° C. and reaction times of ¼ to 4 hours are usually sufficient for effecting the high degree of epoxidation desired in the conjugated diene polymer block.

The epoxidation is then followed by a hydrolysis step to convert at least about 50% of the epoxide rings to the corresponding glycols. It is preferred that at least 50% of the conjugated diene bonds in the center block be converted to the epoxide derivative and in the hydrolysis step it is preferred that at least 50% of these epoxide rings be broken with the formation of corresponding hydroxyls or glycol units. Hydrolysis may be readily effected by moderate heating in the presence of water and a small amount of a strong mineral acid. The presence of certain low molecular weight alcohols expedites the hydrolysis. Temperatures in the order of 25–75° C. and times in the order of ¼ to 8 hours are usually sufficient for this hydrolysis step.

The products of this hydrolysis procedure are rarely if ever "pure" hydroxyl derivatives. On the contrary, analytical procedures indicate that a substantial amount of ether rings still remain and a substantial amount of side reactions as yet undetermined also appear to occur.

The products formed according to the present invention are highly hydroxylated in their conjugated diene center block while the monovinyl arene polymer blocks are virtually unaltered. In their epoxide form there is little visual evidence of the change in the chemical nature of the block copolymer. However, upon hydroxylation sharp changes are noted insofar as a drastic reduction in the elastomeric character of the dry polymer. It is noteworthy that these polymers not only swell and absorb large amounts of hydrogen bonding solvents, including water and alcohols, but they also appear to be capable of retaining these solvents for long periods of time instead of losing them by normal evaporation. Another striking feature is the increase in plasticity and elastic properties of the hydroxylated polymers upon their absorption of 2–20% by weight of water. Thus it can be said that water performs a unique function of acting as a plasticizer for these polymers which may be referred to with some reservation as "hydrophilic" polymers. The other striking and characterizing physical property of these hydroxylated block copolymers is the combination of their ability to absorb and retain water while at the same time retaining a substantial amount of their tensile strength. This is in sharp opposition to the experience with ordinary conjugated diene homopolymers or random copolymers which may be capable of absorbing water but which have virtually no tensile strength after such absorption. Thus these properties indicate that the block copolymers are promising for the function of semipermeable membranes and also may serve in compositions utilized for human body implants. The following working examples illustrate the preparation and properties of the subject epoxidized and hydroxylated block copolymers.

EXAMPLE I

The block copolymer utilized in a typical epoxidation had the general structure polystyrene-polybutadiene-polystyrene, the average block molecular weights being 9,500–52,000–9,500.

Epoxidation

To 200 g. of block copolymer dissolved in 3,000 g. of benzene there was added over a period of 30 minutes 284 g. of 40% peracetic acid (1.49 moles) at 30–35° C. The temperature was held at 30–35° C. for an additional three hours after which 455 g. of sodium carbonate was added to neutralize the acid, followed by filtration of the slurry. The polymer solution was then passed over a bed of activated alumina to remove last traces of acid and peroxide. The polymer contained 10.7% of oxygen.

In a typical hydrolysis of the above epoxidized block copolymer an aqueous solution of perchloric acid modified with isopropyl alcohol was utilized.

Hydrolysis of epoxidized polymer

To 480 g. of epoxidized polymer solution in benzene there was added 240 ml. of a solution 98 parts by volume of water, 2 parts of 70% perchloric acid, and 400 parts of isopropyl alcohol. The container was sealed and tumbled in a 50° C. water bath for six hours. The mixture was neutralized with 15 ml. of 1.0 normal NaOH, washed with water, and coagulated in hot water and dried in a vacuum oven. The hydroxylized product contained 15.0% oxygen.

A series of polymers were epoxidized and then hydroxylized as described above. Their sensitivity to a number of solvents and water insofar as room temperature absorption was concerned was tested. The following table gives details of the extent of oxidation and hydrolysis and the capability of the derivatives to absorb the listed solvents and water. In the table the following codes are employed.

SIS — Polystyrene-polyisoprene-polystyrene having block molecular weights of 10,000–140,000–10,000.
SBR — Random styrene-butadiene copolymer containing about 20% styrene.
BR — Commercial polybutadiene rubber.
SBS — Polystyrene-polybutadiene-polystyrene having block molecular weight of 9,500–52,000–9,500.

TABLE I.—PROPERTIES OF POLYMERS AFTER EPOXIDATION AND HYDROLYSIS

| Polymer epoxidized | SIS | SBR | BR | SBS |
|---|---|---|---|---|
| Percent wt. O in epoxide (found) | 10.6 | 11.8 | 14.8 | 10.7 |
| Percent wt. O for complete epoxidation | 17.1 | 19.2 | 22.8 | 17.8 |
| Percent of C=C epoxidized (theoretical) | 58 | 56 | 59 | 55 |
| Percent wt. O in glycol (found) hydrolyzed 6 hrs | 14.2 | 16.2 | 19.8 | 15.0 |
| Hydrolyzed 4 hrs | | 14.9 | 19.2 | |
| Theoretical percent wt. O in glycol (based on epoxide) | 19.0 | 20.8 | 25.4 | 19.1 |
| Percent of epoxide hydrolyzed | ~43 | ~34 | ~41 | ~51 |
| Percent wt. increase in solvent in 4 hrs. at room temperature: | | | | |
| IPA | 120 | 85 | 100 | 80 |
| Methanol | 105 | 70 | 150 | 75 |
| Chloroform | (¹) | (²) | 850 | (²) |
| Toluene | (¹) | 130 | 45 | 210 |
| Isooctane | 0.5 | 0.0 | 0.0 | 0.0 |
| Water, 5 days | ³1.3 | 3.3 | 7.1 | 4.0 |
| Water, 10 days | 2.7 | ⁴4.7 | ⁴14.0 | ⁴4.8 |

¹ Dissolved.
² Too soft to handle; badly swollen, may not dissolve completely on continued contact.
³ Two days.
⁴ Twenty days.

EXAMPLE II

In order to demonstrate the superior tensile strength of hydroxylated block copolymers compared with a typical hydroxylated rubber (polybutadiene), two samples were prepared by the epoxidation and hydrolysis steps outlined in Example I. Table II gives the physical properties of these two polymers. The block polymer had the structure SBS (see nomenclature above), the block molecular weights being 9,500–52,000–9,500. The polybutadiene was solution polymerized, using a lithium alkyl catalyst and had an intrinsic viscosity of 2.0 dl./g.

TABLE II

| Description | SBS | Hydroxylated SBS | Hydroxylated polybutadiene |
|---|---|---|---|
| Percent wt. oxygen | | ¹15.0 | 19.7 |
| Tensile strength | 5,000 | 1,600 | 990 |
| 300% modulus | 450 | 610 | 250 |
| Elongation at break | 990 | 560 | 620 |
| Set at break | 20 | 30 | 10 |

¹ 20.6 in B block.

Samples of these two polymers were soaked in water for 13 days at room temperature, resulting in the striking data given in Table III.

TABLE III

| Description | Hydroxylated SBS | Hydroxylated polybutadiene |
|---|---|---|
| Percent water absorbed | ¹4.7 | 6.1 |
| Tensile strength | 1,440 | 450 |
| 300% modulus | 760 | 210 |
| Elongation at break | 420 | 430 |
| Set at break | 20 | 10 |

¹ 6.4 in B block.

I claim as my invention:

1. A water swellable block copolymer having the general configuration:

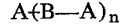

$$A(B-A)_n$$

wherein each A is a polymer block of a monovinyl arene, each block A having an average molecular weight of 6,000–30,000, $n$ is an integer from 1 to 8 and B is a hydroxylated conjugated polymer block, at least 50% of the diene linkages in block B being hydroxylated, block B having an average molecular weight between 20,000 and 300,000, said hydroxylated block B having pairs of hydroxyl groups attached to adjacent carbon atoms.

2. A copolymer according to claim 1 wherein the blocks A are polystyrene blocks and block B is a hydroxylated polybutadiene block.

3. A composition comprising a major proportion of the copolymer of claim 1 and as a plasticizer therefor 2–20% by weight, based on the copolymer, of water.

4. A block copolymer according to claim 2 wherein the hydroxylated conjugated diene center block also bears a minor proportion of epoxide substituents.

5. A process of preparing a water swellable block copolymer having the general configuration:

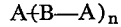

$$A(B-A)_n$$

wherein each A is a polymer block of a monovinyl arene, each block A having an average molecular weight of 6,000–30,000, $n$ is an integer from 1 to 8 and B is a hydroxylated conjugated diene polymer block, at least 50% of the diene linkages in block B being hydroxylated, block B having an average molecular weight between 20,000 and 300,000, said polymer being obtained by epoxidation of block B followed by hydrolysis in the presence of water and a mineral acid whereby both of the carbon atoms bearing an epoxide bridge are substituted with hydroxyls.

References Cited

UNITED STATES PATENTS

| | | | |
|---|---|---|---|
| 2,829,130 | 4/1958 | Greenspan | 260—94.7 |
| 2,829,135 | 4/1958 | Greenspan | 260—94.7 |
| 3,265,765 | 8/1966 | Holden | 260—880 |
| 3,488,394 | 1/1970 | Cummins | 260—94.7 |

PAUL LIEBERMAN, Primary Examiner

U.S. Cl. X.R.

260—94.7, 837, 876, 880

PO-1050
(5/69)

UNITED STATES PATENT OFFICE
CERTIFICATE OF CORRECTION

Patent No. 3,555,112            Dated January 12, 1971

Inventor(s)   DE LOSS E. WINKLER

It is certified that error appears in the above-identified patent and that said Letters Patent are hereby corrected as shown below:

In claim 1, line 7 after "conjugated" the word -- diene -- should appear.

Signed and sealed this 22nd day of June 1971.

(SEAL)
Attest:

EDWARD M. FLETCHER, JR.            WILLIAM E. SCHUYLER,
Attesting Officer                     Commissioner of Pate